April 17, 1934.　　　　J. W. SMITH　　　　1,955,102
SPRING CONNECTION
Filed Dec. 4, 1930
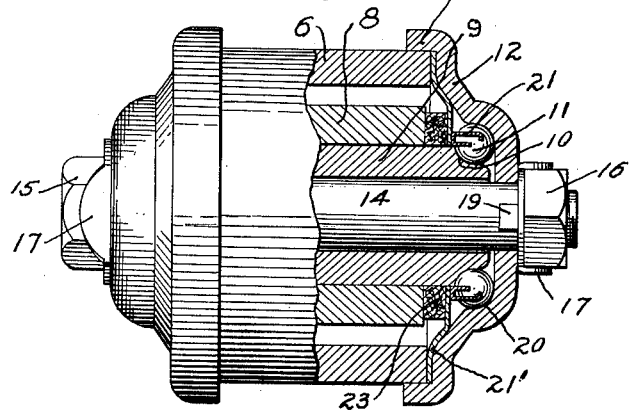
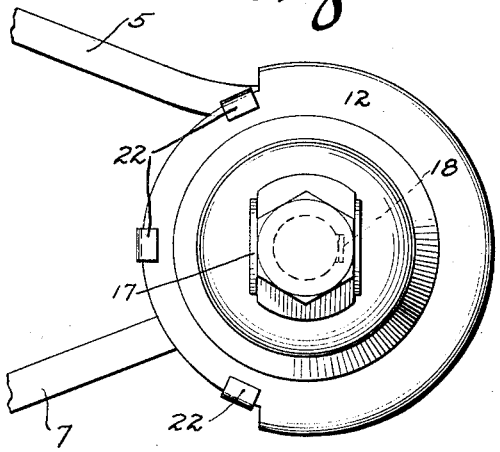
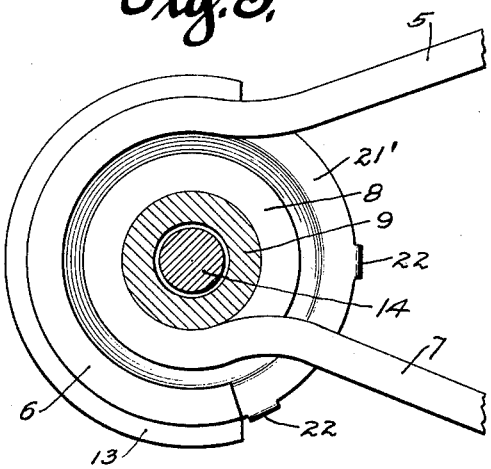
INVENTOR
John W. Smith
BY
Mitchell Burkart
ATTORNEYS.

Patented Apr. 17, 1934

1,955,102

UNITED STATES PATENT OFFICE 1,955,102

SPRING CONNECTION

John W. Smith, New Britain, Conn., assignor to The Fafnir Bearing Company, New Britain, Conn., a corporation of Connecticut Application December 4, 1930, Serial No. 499,926

14 Claims. (Cl. 267—55)

My invention relates to a spring connection, and more particularly though not exclusively to a connection for connecting the ends of spring eyes in an elliptic type spring. My invention might be said to be in the nature of an improvement on a construction disclosed in application of Raymond R. Searles, Serial No. 5,623, filed January 29, 1925.

It is the principal object of the present invention to provide a sturdy, serviceable spring connection, which is simple in construction, cheap to manufacture, and easy to assemble and disassemble.

It is another object to provide a spring end connection having certain improved details of construction.

In the drawing which shows, for illustrative purposes only, a preferred form of the invention—

Fig. 1 is a view in partial section of a spring connection embodying features of the invention;

Fig. 2 is a view in end elevation viewed from the left in Fig. 1;

Fig. 3 is a view similar to Fig. 2 but viewed from the right in Fig. 1 and having certain parts removed and certain parts shown in section.

While the invention will be described as embodied in a connection for connecting upper and lower leaves of an elliptical spring, it is to be understood that the principles of the invention are of broader application.

In said drawing, 5 indicates a leaf of an elliptic spring having an eye 6 thereon. The eye 6 is not completely closed, as appears more particularly in Fig. 3. 7 indicates a second leaf to be connected to the leaf 5. The leaf 7 is provided with an eye 8. The eye 8 carries bearing means, preferably hollow and in the form of a through pin 9 which may be a tight frictional fit or may be positively secured in the eye 8 so that it may not move therein. As illustrated, the hollow pin 9 extends beyond the sides of the eye 8 and each end is provided with a raceway 10 for anti-friction bearing members such as the balls 11.

The open spring eye 6 is provided with bearing means. As illustrated, I employ at each end of the eye 8 a bearing cap 12, which, if desired, may be formed of pressed metal. As illustrated, each bearing cap 12 is of shallow cup form and is provided with a marginal flange 13 to embrace the outside of the spring eye 6 so as to hold each end cap against transverse dislodgment. The end caps may be secured together by means of a through bolt 14 having a head 15 at one end and a nut 16 at the other end. Suitable lock washers 17—17 may be employed for preventing rotation of the bolt 14 and the nut 16. As illustrated, each end cap may have a notch 18 in the bore for the bolt 14 into which notch a tongue 19 from the lock washer 17 may extend.

In the preferred form, the balls 11—11 are unitarily carried by the end caps 12. Each end cap, as illustrated, is provided with a raceway 20 which is preferably directly formed thereon. The balls or other anti-friction bearing members may be held in a suitable retainer 21 or may be otherwise held, for example as disclosed in Searles application, Serial No. 19,546, filed March 31, 1925. A retaining plate 21', preferably of sheet metal, may serve to assist in holding the balls 11—11 in place. As illustrated, the plate 21' fits within the range portion 13 on each bearing cap and may be provided with fingers 22 which may be bent over the outside of the end cap on a portion where the flange part 13 is cut away to provide a sufficient clearance for the passage of the spring leaf 7. Thus, when the end caps are in place, as illustrated more particularly in Fig. 1, each plate 21' will be interposed between the edges of the spring eye 6 and the end caps. When the end caps are removed, the bent over fingers 22 will serve to cause the plate 21' to move with the end caps and retain the balls in place. Clearly, the plates 21' could be pressed into or be otherwise secured to the end caps.

A washer 23 of felt or other material may surround the pin 9 and be interposed between the spring eye 8 and part of the cap such as the plate 21'. Thus, the bearing portion of the connection will be effectively sealed against the entry of dust and dirt, and lubricant in the space adjacent the balls will be effectively retained.

It will be observed that assembly of the device is a simple matter. The bearing member 9 is secured in the spring eye 8, after which the end caps with assembled bearing members are set in place on the spring eye 6, after which the through bolt is put in place to retain all of the members in assembled relation. In the form illustrated, the balls take both radial and end thrusts. It is preferable to have the spring eye 8 of such a width and the raceways 10 at such a distance apart that when the nut 16 on the through bolt is screwed up, the end caps will firmly engage the spring eye 6, and the balls will fit the races so as to provide a good bearing. Obviously, shims may be interposed between the spring eye 6 and the end caps.

It will be seen that a spring connection of the type herein disclosed will provide a squeakless joint between the leaves 5 and 7. The parts are all of simple construction and cheap to manufacture. The device is quite sightly.

While the invention has been described in considerable detail and one specific form illustrated, it is to be understood that the invention may be otherwise embodied and various changes may be made within the scope of the invention as defined in the appended claims.

I claim:

1. In a spring connection, a pair of concentric spring eyes, end bearing caps embracing the ends of one of said eyes, means for securing said bearing caps in place, bearing means carried by the other of said spring eyes, and anti-friction bearing members interposed between said end caps and said bearing means.

2. In a spring connection, a spring eye, end bearing caps embracing opposite ends of said spring eye, a central through bolt for securing said bearing caps to said spring eye, a second spring eye, hollow bearing means carried by said second spring eye and surrounding said through bolt, and anti-friction bearing members interposed between said hollow bearing means and said bearing caps for supporting one of said eyes from the other.

3. In a spring connection, a spring eye, end bearing caps for said spring eye, means for securing said end bearing caps to said spring eye, anti-friction bearing members in said end caps, and plate retaining means carried by said end caps for assisting in retaining said anti-friction bearing members in place in said end caps, a second spring eye, and means carried thereby having raceways to engage said anti-friction bearing members.

4. A bearing cap of the character indicated comprising, a cup-like member having a seat for anti-friction bearing members, and a retaining plate fitting within said cup-like member and having a part crimped over the side of said cup-like member axially opposite the side having said seat for assisting in securing said plate in place.

5. In a connection of the character described, a member having an eye partially open at one side, caps extending over the ends thereof, and means for securing said end caps thereto, said ends caps having raceways formed directly thereon for anti-friction bearing members, anti-friction bearing members on said raceways, and means having raceways complementary to said first mentioned raceways and engaging said anti-friction bearing members, for the purpose described.

6. In a connection of the character described, a member having an eye partially open at one side, cup-like bearing caps extending over the ends of said eye, means for securing said caps to the ends of said eye, anti-friction bearing members unitarily carried in said cup-like bearing member, and means having raceways complementary to said first mentioned raceways and engaging said anti-friction bearing members.

7. In a connection of the character described, a member having an eye partially open at one side, bearing caps for the ends of said member, a through bolt extending through said caps for securing the same to said member, means for holding said through bolt against rotation relatively to said end caps, and means having raceways thereon, and raceways in said end bearing caps, and anti-friction bearing members interposed between said raceways, said end bearing caps being secured to the first mentioned member by said through bolt independently of said anti-friction bearing members.

8. In a spring connection, a member having a bore therein, end bearing caps having flange parts extending over said member for sustaining said end caps against transverse dislodgment therefrom, means for holding said end caps against longitudinal dislodgment from said member, anti-friction bearing members in said end caps, plate means interposed between said end caps and said member, and means having raceways engaging said anti-friction bearing members, for the purpose described.

9. In a spring connection, a spring eye, end bearing caps having raceways therein, said end caps having flanges extending over the outside of said spring eye for holding said caps in place, anti-friction bearing members on said raceways, retaining plate means for assisting in holding said anti-friction bearing members on said raceways, a through bolt for securing said end caps to said spring eye, a second spring eye within said first mentioned spring eye and having hollow bearing means projecting at opposite sides thereof and having raceways engaging said anti-friction bearing members, and seal rings extending over said hollow bearing means and interposed between said last mentioned spring eye and said end caps for excluding dust from and retaining lubricant on said anti-friction bearing members.

10. In a spring connection, a spring having an eye at its end, a second spring having a partially closed eye at its end which partially surrounds said first mentioned eye, a hollow bearing pin secured in the first mentioned eye and having raceways at the ends thereof, caps having complementary raceways, said caps overstanding and secured to the ends of the partially closed spring eye, means passing freely through said hollow bearing pin to secure said caps in said position, and anti-friction devices between said complementary raceways.

11. In a spring connection, a spring having an eye at its end, a second spring having a partially closed eye at its end which partially surrounds said first mentioned eye, a hollow bearing pin secured in the first mentioned eye and having raceways at the ends thereof, caps having complementary raceways, said caps overstanding and secured to the ends of the partially closed spring eye, means passing freely through said hollow bearing pin to secure said caps in said position, anti-friction devices between said complementary raceways, and a dust protecting means for said raceways and anti-friction devices.

12. In a spring connection, a spring having an eye at its end, a second spring having a partially closed eye at its end which partially surrounds said first mentioned eye, a hollow bearing pin secured in the first mentioned eye and having raceways at the ends thereof, caps having complementary raceways, said caps overstanding and secured to the ends of the partially closed spring eye, means passing freely through said hollow bearing pin to secure said caps in said position, anti-friction devices between said complementary raceways, and a dust protecting means for said raceways and anti-friction devices, said dust protecting means being located and held between said anti-friction means and the ends of said eyes.

13. In a connection of the character described, a member having an eye at one end which eye is partially open at one side, a second member passing through the side opening in said eye and itself having an eye within said first eye, end caps overstanding the ends of the partially open eye and the ends of the second eye, means for securing said caps against rotation at the ends of the partially open eye, a bearing member carried by the inside eye, raceways thereon, and complementary raceways on the caps with anti-friction devices between said raceways whereby said eyes may freely oscillate relatively to each other.

14. In a connection of the character described, a member having an eye at one end which eye is partially open at one side, a second member passing through the side opening in said eye and itself having an eye within said first eye, end caps overstanding the ends of the partially open eye and the ends of the second eye, means for securing said caps against rotation at the ends of the partially open eye, a bearing member carried by the inside eye, raceways thereon, and complementary raceways on the caps with anti-friction devices between said raceways whereby said eyes may freely oscillate relatively to each other, and a dust protecting means between the anti-friction bearings and the side opening in said first mentioned eye.

JOHN W. SMITH.